Sept. 2, 1958 C. W. GEER 2,850,669

TELEVISION PICTURE TUBE OR THE LIKE

Filed April 26, 1955 2 Sheets-Sheet 1

CHARLES WILLARD GEER
*INVENTOR.*

BY Bruce L. Birchard

HIS ATTORNEY

TELEVISION PICTURE TUBE OR THE LIKE

Filed April 26, 1955 2 Sheets-Sheet 2

CHARLES WILLARD GEER
*INVENTOR.*

BY Bruce L. Birchard
HIS ATTORNEY

United States Patent Office 2,850,669

Patented Sept. 2, 1958

2,850,669

TELEVISION PICTURE TUBE OR THE LIKE

Charles Willard Geer, Long Beach, Calif., assignor to Hoffman Electronics Corporation, a corporation of California Application April 26, 1955, Serial No. 503,884

14 Claims. (Cl. 315—25)

This invention is related to television picture tubes and, more particularly, to an improved television picture tube of the "flat" variety.

For some time manufacturers of television picture tubes for commercial usage and manufacturers of radar display tubes for military uses have been interested in devising a "flat" picture tube. By a "flat picture tube" is meant a tube having a substantially flat face and a minimum depth dimension. Flat picture tubes as have presently been suggested to the industry have been rectangular in shape, possessing a depth of three or four inches, the exact depth depending upon the design requirements of a particular tube in question. The electron gun is conventionally mounted just inside and parallel to one of the picture tube sides. The employment of two sets of grid elements has been considered, one set being disposed on the back of the picture tube and the remaining set being disposed on the top side of the tube. The grids themselves usually take the form of uniformly spaced, parallel wires or other conductive elements. The chief difficulty in having a tube with such a scanning system is that, since a varying voltage must be applied sequentially to each element in succession of the two grid element sets, intricate switching techniques must be employed to accomplish the desired scanning. It would of course be highly desirable for the scanning to be accomplished in the main by the conventional deflection plates or coils and that such grids as are necessary to properly position the electron beam at any particular time be of such nature as to be adaptable for coupling to sources of constant voltage.

Therefore, it is an obpect of the present invention to provide a new and useful "flat" television picture tube.

It is a further object of the present invention to provide a new and useful "flat" television picture tube in which conventional scanning apparatus together with positioning grids adapted for coupling to sources of constant D. C. voltage perform the horizontal and vertical scanning operations.

It is an additional object of the present invention to provide a new and useful "flat" television picture tube in which the picture reproducing area of the tube is free from the inclusion of grid wires or elements.

According to the present invention, a thin, rectangular, flat-faced television picture tube provided with an electron gun having conventional deflection means is provided with uniquely disposed deflection grids or deflection magnets which supply a unique deflection field that will correctly position the electron beam on the face of the tube in accordance with the electrical condition of the deflection means of the electron gun of the tube. The tube additionally is kept free from the employment of electrical deflecting and/or scanning means in the region of the picture reproducing area of the tube, save for a direct current return for the electron stream.

The features of the present invention which are believed to be novel are set forth with particularly in the appended claims. The present invention, both as to its organization and manner of operation, together with further objects and advantages thereof, may best be understood by reference to the following description, taken in connection with the accompanying drawings, in which:

Figure 1:
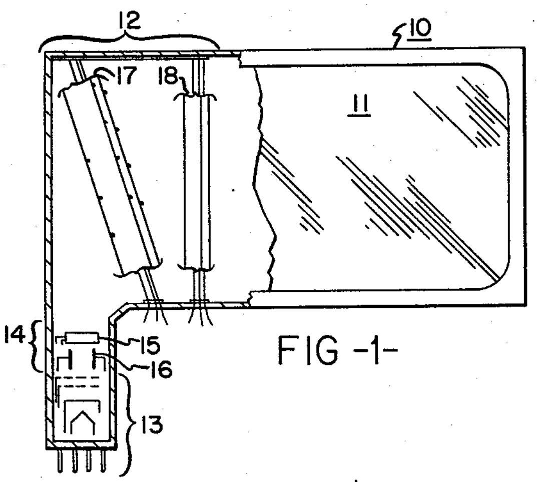
Figure 1 is a frontal view of a first embodiment of a flat television tube according to the present invention.

In Figure 1, television picture tube 10 has viewing area 11, scanning apparatus portion 12, electron gun portion 13, and deflection means portion 14. Electron gun portion 13 comprises a conventional electron gun having heater, cathode, and control and focusing electrodes. The deflection means included within portion 14 may be either horizontal and vertical deflection plates 15 and 16, respectively, or any other type of deflection apparatus such as horizontal and vertical deflection yokes, etc. The scanning apparatus included within portion 12 of television picture tube 10 is provided for the purpose of enabling the deflection means, such as horizontal and vertical deflection plates 15 and 16, to accomplish the desired horizontal and vertical scanning by the electron beam of picture area 11. From Figure 1 it is seen that plates 15 accomplish the horizontal positioning of the electron beam, whereas deflection plates 16 accomplish the vertical scanning of the beam. The scanning apparatus included within portion 12 of picture tube 10 comprises two sets of grids, namely, grid sets 17 and 18. Set 17 aids deflection plates 16 in accomplishing the vertical scanning by the electron beam. Set 18 enables deflection plates 15 to provide for the horizontal scanning of the electron beam. Grid set 17 is shown in detail in Figure 2 and is described in the discussion relating thereto. Figure 3 describes the configuration of grid set 18.

Figure 2:
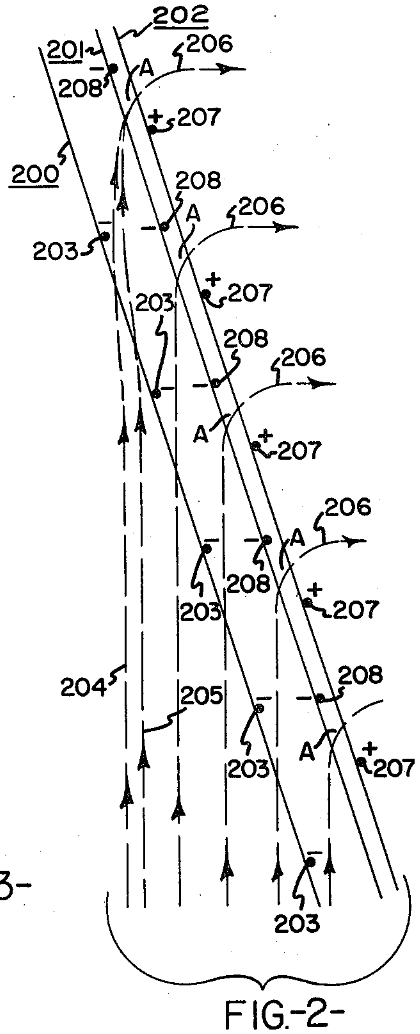
Figure 2 is an enlarged frontal view of the vertical deflecting grid combination shown in Figure 1.
Figure 3:
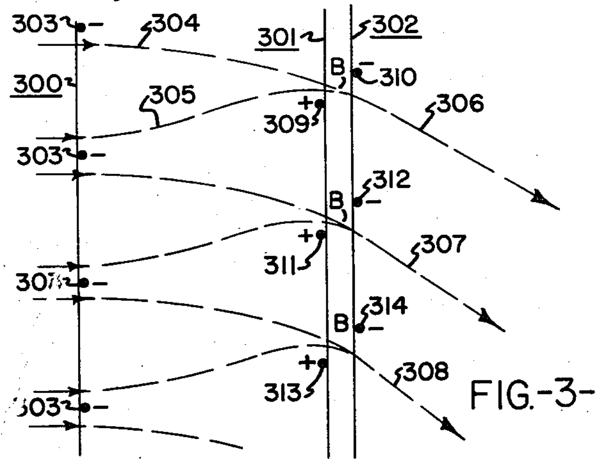
Figure 3 is a plan view of the horizontal deflection grid set shown in Figure 1.

Figure 2 is shown to be an enlargement of a representative portion of grid set 17 in Figure 1. Grid set 17 of Figure 1 is shown in Figure 2 to consist of positioning grid 200 and deflection grids 201 and 202. Positioning grid 200 is shown to consist of a plurality of equally spaced parallel grid wires 203. Positioning grid 200 is adapted for coupling to a D. C. potential source of negative polarity. By the resultant high negative charge upon the several grid wires 203, the electron paths between adjacent grid wires 203 will tend to converge at points A in substantially the same direction. It is interesting to note that despite the continuous change in voltage of the vertical deflection plates which at one instant provides electron path 204 and in another instant produces electron path 205, for example, that the vertical position of the resultant electron path 206 will be substantially constant. Hence, the horizontal trace will in fact be perfectly horizontal and will not have the feature of slight inclination as the horizontal trace progresses with which television picture tubes are characterized at the present time. Grids 201 and 202 may be co-planar or may comprise two separate grid planes. Grid 202 is adapted for coupling to a source of positive D. C. potential. The purpose for each positively charged grid wire 207 is to bend the electron beam 206 at point A a nominal 90° angle so that upon passing through grid 202 the several electron paths 206 will be horizontal. Grid 201 is adapted for coupling to a source of negative D. C. potential so as to enable grid wires 208 of grid 201 to combine with grid wires 207 in providing a relatively uniform field of high field strength to accomplish the bending of electron beams 206.

Rather than consisting merely of parallel grid wires, grid 200 may be of the woven variety or co-planar variety forming in substance a screen mesh of small squares or other geometric figures.

In Figure 3, the horizontal grid set 18 of Figure 1 is shown to consist of positioning grid 300 and deflection grids 301 and 302. These grids are parallel to each other and are closely spaced. Again, deflection grids 301 and 302 may be co-planar or comprise two grid planes as shown. Positioning grid 300 is adapted for coupling to a source of negative D. C. potential so as to enable parallel grid wires 303 to focus electron paths 304 and 305 at point B. Point B will fall somewhere in the vicinity of the deflection grids, and will exist on a line normal to the positioning grid and equidistant from adjacent wires of the positioning grid. Again, positioning grid 303 may simply consist of parallel grid wires or of a wire mesh comprising small circles or other geometric figures of open area outlined by the configuration of the grid mesh.

Figure 4:
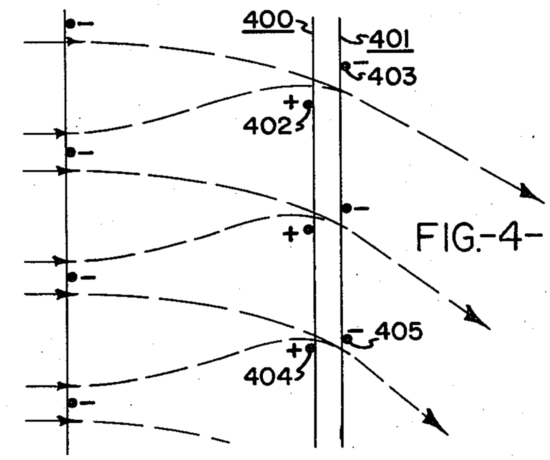
Figure 4 is an alternate form of the horizontal deflection grid sets shown in Figure 3.

Referring to Figure 1, it is seen that for proper impingement of the electron beam upon the picture tube face in regions to the extreme right of the tube face that the angle $\theta_1$ in Figure 3 between the plane of grid 302 and electron beam 306 will have to be greater than succeeding angles of refraction ($\theta_2$ and $\theta_3$) of succeeding electron beams 307 and 308. Therefore, the respective positive and negative voltages applied to grid wire 309 and grid wire 310 will be of less magnitude than the voltages applied to grid wires 311 and 312 and of still less magnitude than the voltages of grid wires 313 and 314. Hence, a center-tapped or other type of voltage divider is suggested for employment with grids 301 and 302. A better approach to the problem, however, is indicated in the configuration of the deflection grids in Figure 4 in which is shown a unique design for deflection grids 400 and 401. As is seen in Figure 4, grid wires 402 and 403 entertain the largest separation of the three groups of grid wires shown. Grid wires 404 and 405 have the smallest separation. Hence, as the electron beam progresses, before passing through the horizontal positioning and deflection grids, to the face of the tube, the field of the deflection grids will appear progressively stronger to the oncoming beam.

Figures 5, 6:
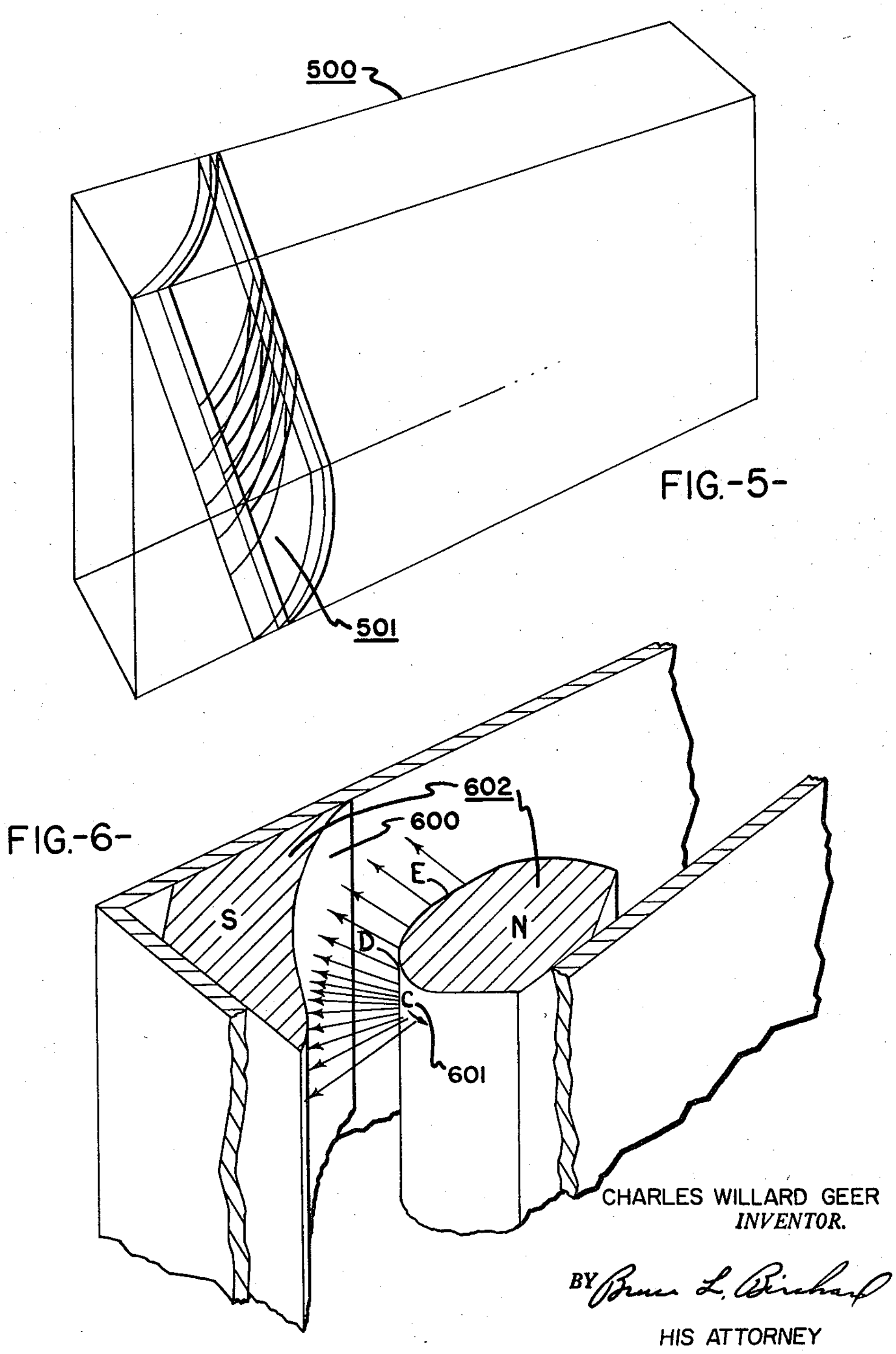
Figure 5 is a second embodiment of a flat picture tube according to the present invention having a single deflection grid combination which in itself provides horizontal and vertical deflection simultaneously, the magnitude of each deflection being dependent upon the electrical condition of the electron gun deflecting means.
Figure 6 is a frontal view of a third embodiment of a flat television picture tube according to the present invention employing two permanent magnets for supplying a deflecting field to the electron stream capable of deflecting the stream both horizontally and vertically, the horizontal and vertical deflection magnitude depending upon the electrical character of the electron gun deflecting means.

In Figure 5, television picture tube 500 is equipped with deflection apparatus 501 which simply comprises the vertical deflection grid set 17 of Figure 1, shown in detail in Figure 2, disposed as a curved surface. When sandwich grid 501 assumes its unique curved configuration, as shown, then for any impingement of the electron beam upon sandwich grid 501 the beam will experience a single deflection bend which of itself will accomplish the simultaneous horizontal and vertical positioning of the beam in accordance with the electrical condition of the horizontal and vertical deflection plates. In the case of the configuration of Figure 5, the positioning grid may be a wire mesh of nominally horizontal and vertical wires which are intermeshed to form geometric figures such as circles, hexagons, or other figure. As an alternate approach to the manufacture of sandwich grid 501, the grid elements may be interspaced by a suitable electron permeable material.

In Figure 6, faces 600 and 601 of magnetic yoke 602 replace the sandwich grid in Figure 5 for accomplishing the simultaneous positioning, both vertically and horizontally, of the electron beam upon the tube face. As is shown in Figure 6, face 601 of yoke 602 is a north pole whereas face 600 is a south pole. The diverging lines of force are in the direction of from the north pole towards the south pole and, by applying the left hand motor rule, the electron beam is found to curve about face 601 in a direction toward the tube face plate. The exact configuration of faces 600 and 601 will be such as to provide a radius of curvature of face 601 at point D of least magnitude, a radius of curvature of the surface of face 601 of intermediate magnitude at point C, and a radius of curvature at point E of greatest magnitude, and face 600 shall be of appropriate design, so that the deflected electron beam will receive a resultant velocity component toward the face of the tube. This configuration will be for the purpose of concentrating the lines of force of the divergent field at point D or nearby where a large flux density is needed.

It readily appears, then, that by the deflection means of either Figure 5 or Figure 6 the simultaneous horizontal and vertical positioning of the electron beam on the face of the television picture tube is accomplished through response to the electrical condition of the horizontal and vertical deflection plates or yokes normally associated with a conventional electron gun. It is to be noted that in all the embodiments presented and in the numerous structural equivalents thereof that horizontal and vertical positioning of the electron beam is accomplished by the fixed electrical disposition of the deflecting apparatus employed. Thus, by such deflection techniques as have been herein outline, varying deflecting voltages are confined exclusively to the horizontal and vertical deflecting plates, or magnetic deflection yokes, whichever are employed. Elaborate switching mechanisms for applying varying voltages to grids housed within the picture portion of the tube are completely eliminated.

It should be mentioned that, while picture tube performance may be reduced, yet, if desired, either negative grid 201 in Figure 2 or negative grid 302 in Figure 3, or both, may be eliminated if cost considerations so dictate.

It will be understood that the above described deflection techniques are equally applicable to both black-and-white and color tubes.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. A flat television picture tube including, in combination, a thin, substantially rectangular tube enclosure comprising a picture reproducing enclosure portion having an associated face plate disposed on one of the major rectangular faces of said tube, and a scanning means enclosure portion disposed laterally to one side of said picture reproducing enclosure portion; an electron gun mounted on said tube enclosure immediately adjacent said scanning means enclosure portion on an axis lying in a plane substantially paralleling the opposite major rectangular faces of said tube and passing through only said scanning means enclosure portion, sweep deflection means in said electron gun, for forming a scan pattern beam, and electron beam refractive scanning means mounted within said scanning means enclosure portion for redirecting electrons forming said scan pattern from said gun first into directions parallel to said face plate and thence into directions impinging upon said face plate, the points of impingement of the beam upon said face plate being varied in accordance with the scanning condition of the deflection means of said electron gun.

2. Apparatus according to claim 1 in which said scanning means comprises a vertical scanning grid combination and a horizontal scanning grid combination; said vertical scanning grid combination including a positioning grid adapted for coupling to a source of negative D. C. potential, and at least one deflection grid following said positioning grid, said deflection grid being adapted for coupling to a source of positive D. C. potential, said positioning and deflection grids being disposed in parallel planes each being angularly inclined with respect to said axis of said electron gun; said horizontal scanning grid combination including a positioning grid adapted for coupling to a source of negative D. C. potential, and at least one deflection grid following said horizontal scanning positioning grid, said deflection grid being adapted for coupling to a source of positive D. C. potential, said positioning and deflection grids of said horizontal scanning grid combination being disposed in parallel planes which in turn are each parallel to said axis of said electron gun.

3. Apparatus according to claim 2 in which a second vertical scanning deflection grid is disposed parallel to and adjacent said deflection grid of said vertical scanning grid combination, and in which a second horizontal scanning deflection grid is disposed parallel to and adjacent said deflection grid of said horizontal scanning grid combination, said second deflection grids being adapted for coupling to a source of negative D. C. potential.

4. Apparatus according to claim 2 in which said positioning grid of said vertical scanning grid combination comprises equally spaced, co-planar parallel grid wires disposed perpendicular to said axis of said electron gun, and in which said positioning grid of said horizontal scanning grid combination comprises equally spaced, co-planar, parallel grid wires each being parallel to said axis of said electron gun.

5. Apparatus according to claim 3 in which said positioning grid of said vertical scanning grid combination comprises equally spaced, co-planar, parallel grid wires disposed perpendicular to said axis of said electron gun, and in which said positioning grid of said horizontal scanning grid combination comprises equally spaced, co-planar, parallel grid wires each being parallel to said axis of said electron gun.

6. Apparatus according to claim 4 in which said positioning grids of said vertical and horizontal scanning grid combinations each includes a plurality of equally spaced, co-planar, parallel grid wires disposed across and perpendicular to said parallel grid wires of each of said positioning grid.

7. Apparatus according to claim 5 in which said positioning grids of said vertical and horizontal scanning grid combinations each includes a plurality of equally spaced, co-planar, parallel grid wires disposed across and perpendicular to said parallel grid wires of each of said positioning grid.

8. Apparatus according to claim 4 in which said vertical and horizontal deflection grids each comprise co-planar, parallel, equally spaced grid wires disposed in parallel with said grid wires of said vertical and horizontal positioning grids, respectively.

9. Apparatus according to claim 5 in which said vertical and horizontal deflection grids each comprise co-planar, parallel grid wires disposed in parallel with said grid wires of said vertical and horizontal positioning grids, respectively.

10. Apparatus according to claim 9 in which corresponding wires of said horizontal deflection grids are each adapted for coupling to corresponding positive and negative potentials the magnitudes of which are related to the positioning of said wires relative to said face plate of said tube.

11. Apparatus according to claim 9 in which corresponding wires of said horizontal deflection grids are uniquely separated in accordance with the positioning of said wires relative to said face plate of said tube.

12. Apparatus according to claim 1 in which said scanning means comprises a single scanning grid combination, said grid combination including a positioning grid adapted for coupling to a source of negative D. C. potential and at least one deflection grid following said positioning grid, said deflection grid being adapted for coupling to a source of positive D. C. potential, said positioning and deflection grids defining peripheral areas of imaginary coaxial cylinders the mutual axis of which is angularly inclined with respect to said axis of said electron gun.

13. Apparatus according to claim 12 in which a second deflection grid is disposed adjacent said deflection grid and is adapted for coupling to a source of negative D. C. potential.

14. Apparatus according to claim 1 in which said scanning means comprises magnetic means having two faces disposed so as to produce a divergent magnetic field capable of simultaneously positioning both vertically and horizontally the electron beam upon said face plate in accordance with the electrical condition of said deflection means associated with said electron gun.

References Cited in the file of this patent

UNITED STATES PATENTS

| | | |
|---|---|---|
| 2,449,558 | Lanier et al. | Sept. 21, 1948 |
| 2,513,742 | Pinciroli | July 4, 1950 |
| 2,728,025 | Weimer | Dec. 20, 1955 |
| 2,739,244 | Sheldon | Mar. 20, 1956 |